Dec. 29, 1942. A. S. VOLPIN 2,306,838
SLUSH PUMP PISTON
Filed Nov. 2, 1940
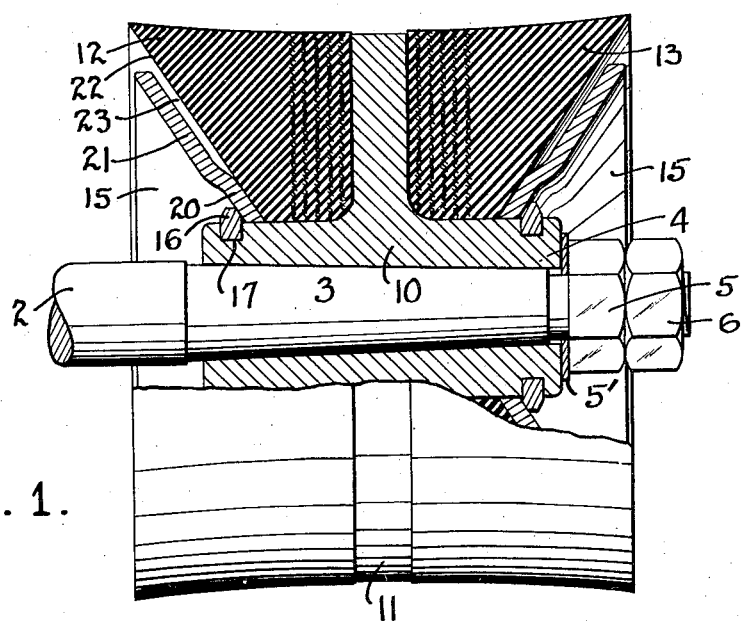
Fig. 1.
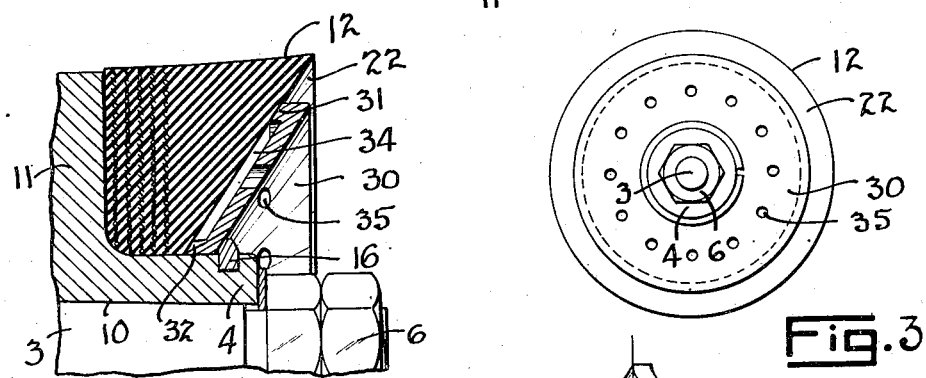
Fig. 2.
Fig. 3.
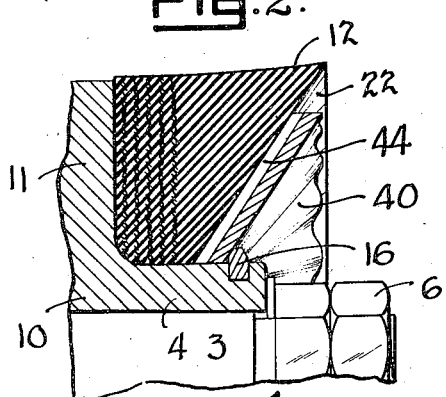
Fig. 4.
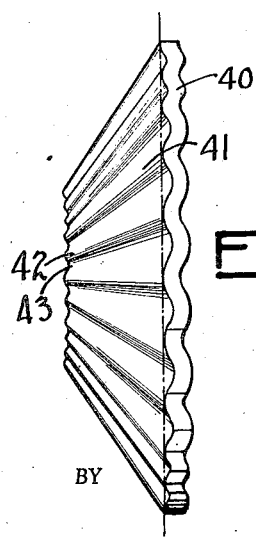
Fig. 5.
A. S. VOLPIN
INVENTOR.
BY Lester B. Clark.
ATTORNEY.

Patented Dec. 29, 1942

2,306,838

UNITED STATES PATENT OFFICE 2,306,838

SLUSH PUMP PISTON

Alexander S. Volpin, Houston, Tex., assignor to Mission Manufacturing Company, Houston, Tex.

Application November 2, 1940, Serial No. 364,023

10 Claims. (Cl. 309—4)

The invention relates to a slush pump piston, and particularly to a type of piston having removable packing rings wherein a space is provided to allow the packing a slight amount of movement or swelling when in use.

The invention is generally an improvement of the type of piston and retainer plate shown in Patent 2,189,839 granted February 13, 1940.

It is one of the objects of the invention to provide a retainer plate for slush pump piston packing wherein a space of uniform width is provided between the retainer plate and the packing to allow for movement and swelling of the packing.

Another object of the invention is to provide a dished retainer plate for slush pump piston packing which has an offset portion therein.

Another object of the invention is to provide a retainer plate for slush pump piston packing having lateral flanges thereon to engage the packing while leaving a space of uniform width between the plate and the packing.

Still another object of the invention is to provide a fluted retainer plate for slush pump piston packing.

Other and further objects of the invention will be readily apparent when the following description is considered in connection with the accompanying drawing, wherein:

Fig. 1 is a side elevation of a slush pump piston to which the invention has been applied and illustrates in section an offset type of retainer plate.

Fig. 2 is a broken vertical section of another form of plate having lateral flanges.

Fig. 3 is an end view of a piston having a plate such as is shown in Fig. 2.

Fig. 4 is a broken vertical section of a fluted type of retainer plate.

Fig. 5 is an edge view of the fluted plate of Fig. 4.

In Fig. 1 the piston rod 2 has a tapered area 3 to which the piston 4 is applied. A washer 5' cooperates with the nuts 5 and 6 in firmly lodging the piston upon the rod so that the piston may be reciprocated in the cylinder to accomplish the pumping operation.

The piston is made up of the hub portion 10 which has the radial flange 11 thereon. The packing rings 12 and 13 are identical and will be slipped over the ends of the hub to abut the flange 11. A retainer plate 15 is next positioned over the end of the hub and against the packing so as to hold the packing in position. A lock ring 16 is then snapped into a groove 17 in the hub so as to lock the retainer plate in position.

The retainer plate 15 of Fig. 1 is of a peculiar configuration in that it is generally dished but it has an offset portion 20 adjacent its inner edge. This offset is arranged to be clamped in place by the lock ring 16 and to abut the inner edge of the outer end of the packing ring 12 or 13.

The outer portion 21 of the plate 15 is inclined at the same inclination as the conical end face 22 of the packing 12. This arrangement provides a space 23 between the portion 21 of the plate and the end face 22 of the packing. It should be particularly noted that this space 23 is of uniform width and is provided to accommodate swelling of the material and a small amount of flexing on the part of the packing.

Fig. 2 shows another form of plate at 30, which plate is conical but has the inwardly or laterally extending flange 31 at its outer edge and 32 at its inner edge. These two flanges contact the end face 22 of the packing 12 and retain it firmly in position.

The lateral flanges 31 and 32, however, create a space 34 intermediate the edges of the plate 30. This space is provided in this modification for the same purpose as the space 23 of Fig. 1. The equalizer openings 35 may be provided in the plate to allow for breathing upon operation of the piston.

Fig. 4 shows another form of the invention wherein the plate 40 has a fluted configuration, as best seen in Fig. 5. The face 41 of the piston which is to engage the end face 22 of the packing ring is provided with ribs 42 and depressions 43 which are created by the fluted arrangement. These ribs and flutes extend radially of the conical plate. When the plate is in position as seen in Fig. 4 the recesses 43 provide a space 44 of uniform width which is provided for the same purpose as space 23 in the form of Fig. 1.

Broadly, the invention contemplates a retainer plate for slush pump pistons which will provide a breathing or swelling space of uniform width.

What is claimed is:

1. A slush pump piston including a metal body, packing rings on said body, and means at each end of the body to retain and confine the packing rings comprising a plate and anchor construction, said plate being dished and having an offset portion to space the outer edge from the packing ring.

2. A slush pump piston including a metal body, packing rings on said body, and means at each end of the body to retain and confine the packing rings comprising a plate and anchor construction, said plate being dished and having an offset portion to space the outer edge from the packing ring so as to provide space for swelling of the packing ring.

3. A piston having a packing supporting body, a removable packing ring thereon, a conical end on said packing ring, a dished retainer plate contacting said conical end of said packing ring, said plate being constructed and arranged to provide a space of uniform width extending outwardly between the plate and end of said packing ring to provide for swelling of the packing ring.

4. A slush pump piston having a packing supporting body and a central flange, a removable packing ring on said body abutting said flange, a conical outer end on said packing ring, a dished retainer plate contacting said conical end, said plate being constructed and arranged to provide a space of uniform width extending outwardly between the plate and end to provide for swelling of the packing, the contacting portion of said plate being an annular lateral flange.

5. A slush pump piston having a packing supporting body and a central flange, a removable packing ring on said body abutting said flange, a conical outer end on said packing ring, a dished retainer plate contacting said conical end, said plate being constructed and arranged to provide a space of uniform width extending outwardly between the plate and end to provide for swelling of the packing, the contacting portion of said plate being an annular lateral flange at the inner and outer edges of the plate.

6. A piston having a packing supporting body, a removable packing ring thereon, a conical end on said packing ring, a dished retainer plate contacting said conical end, said plate being constructed and arranged to provide a space of uniform width extending outwardly between the plate and end to provide for swelling of the packing, the contacting portion of said plate being an offset area at the inner edge.

7. A piston having a packing supporting body, a removable packing ring thereon, a conical end on said packing ring, a dished retainer plate contacting said conical end, said plate being constructed and arranged to provide a space of uniform width extending outwardly between the plate and end to provide for swelling of the packing, the contacting portion of said plate being spaced ribs.

8. A retainer plate for slush pump piston packings comprising a relatively thin sheet metal plate of dished shape, and an offset portion adjacent the inner edge thereof, said plate having substantially parallel inner and outer faces.

9. A retainer plate for slush pump piston packings comprising a metal body of dished shape to slide over the piston body and abut the packing, and a lateral flange at the inner and outer edges of said plate to normally contact the packing so that said packing may flow into the area between the flanges in event of a greater pressure.

10. A retainer plate for slush pump piston packings comprising a rigid sheet metal plate of dished shape so as to contact and support the packing, said plate being fluted to provide radial grooves adapted to receive the packing but with only the crest of the flutes normally being engaged by the packing.

ALEXANDER S. VOLPIN.